April 11, 1961  W. BUSS  2,979,294
PARACHUTE COMBINATION AND EJECTION DEVICE
Filed June 25, 1956  4 Sheets-Sheet 1

INVENTOR.
WILHELM BUSS
BY
ATTORNEY

April 11, 1961 W. BUSS 2,979,294
PARACHUTE COMBINATION AND EJECTION DEVICE
Filed June 25, 1956 4 Sheets-Sheet 2

INVENTOR.
WILHELM BUSS
BY
Eugene O. Hebern
ATTORNEY

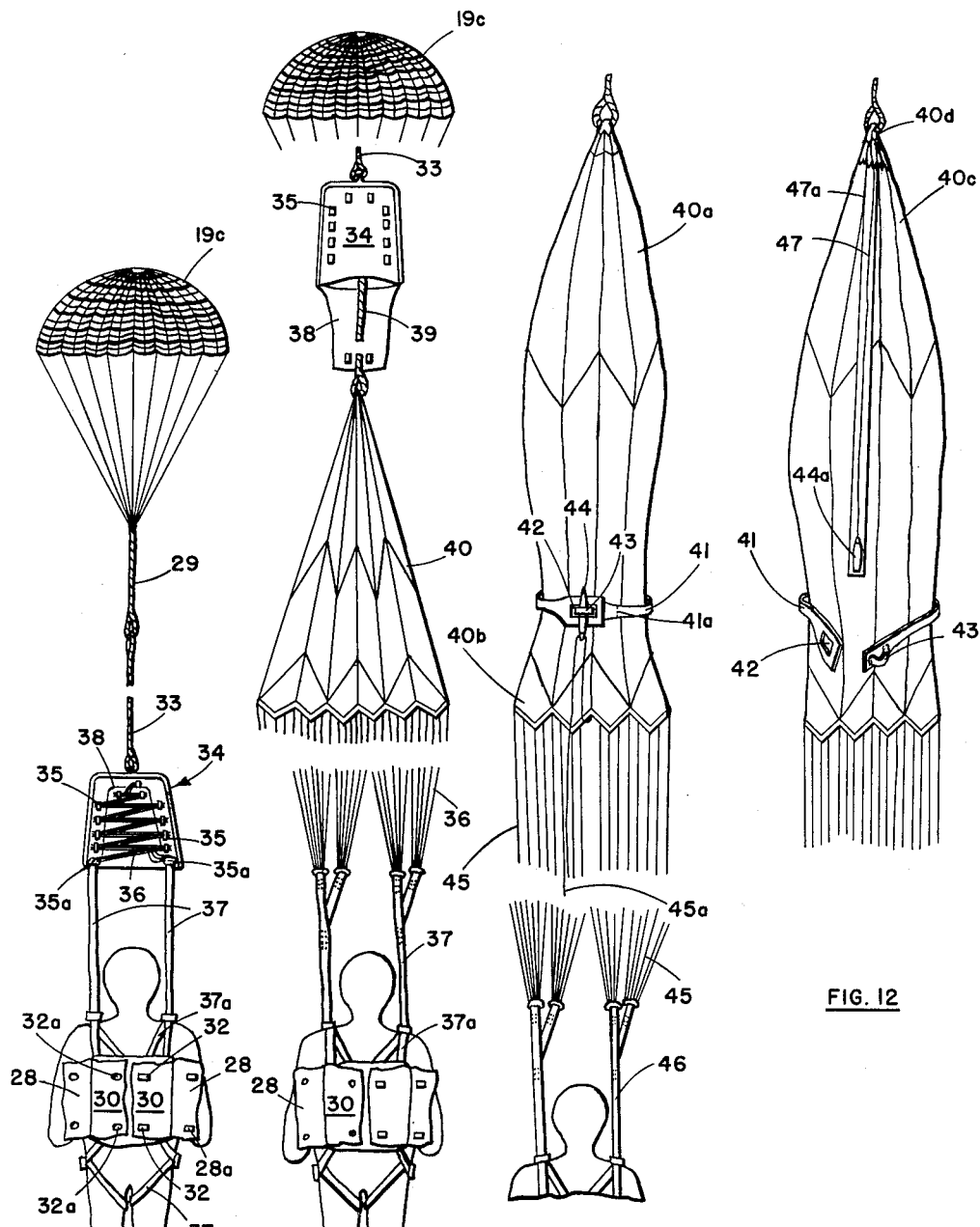

April 11, 1961 W. BUSS 2,979,294
PARACHUTE COMBINATION AND EJECTION DEVICE
Filed June 25, 1956 4 Sheets-Sheet 4
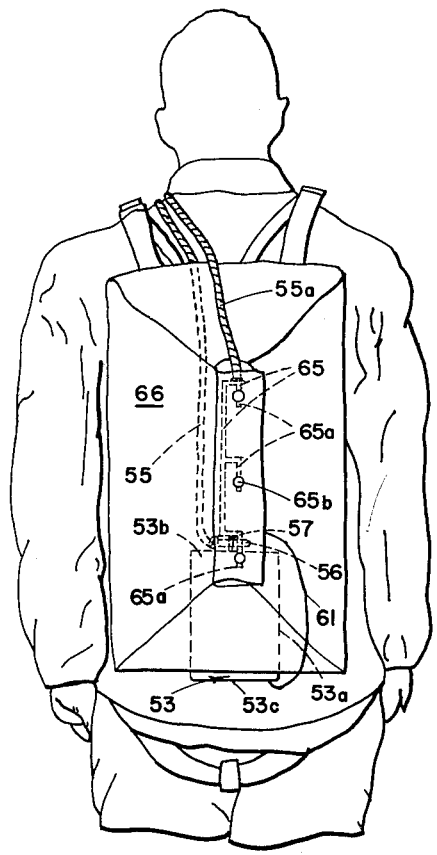
FIG. 13
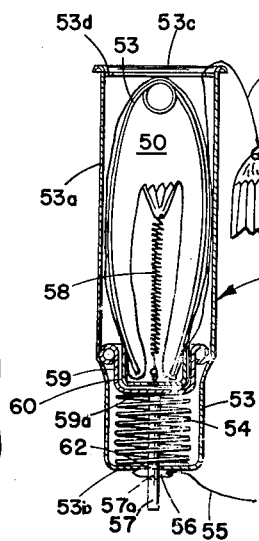
FIG. 14
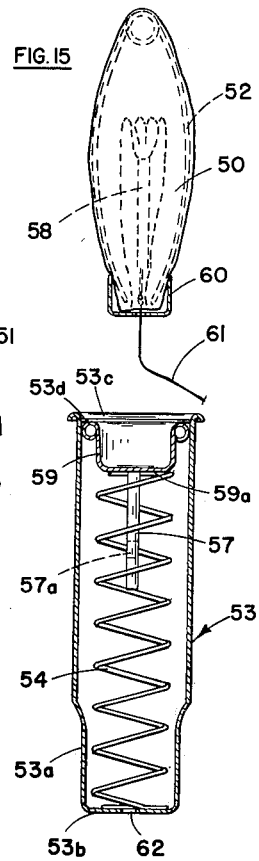
FIG. 15
FIG. 17
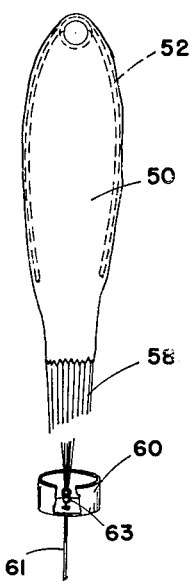
FIG. 16
INVENTOR.
WILHELM BUSS
BY Eugene O. Heberer
ATTORNEY United States Patent Office 2,979,294
Patented Apr. 11, 1961

2,979,294

PARACHUTE COMBINATION AND EJECTION DEVICE

Wilhelm Buss, 1528 Orange Ave., El Centro, Calif., assignor of one-half to Paul O. Tobeler, doing business as Trans-Oceanic, Los Angeles, Calif.

Filed June 25, 1956, Ser. No. 593,399

11 Claims. (Cl. 244—148)

This invention relates to the combination of a main parachute, a brake parachute and an ejection device for the pilot parachute, and more particularly, to the three types of parachutes and the manner in which they are packaged in the parachute packs.

In the conventional types of parachutes, the pack cover is opened either by pulling a handle on the rip-cord or, in automatic operation by a static line attached to the airplane. When this is done the entire parachute, including the canopy, the shroud lines and the pilot chute are released suddenly and completely. The pilot parachute opens itself by means of a spring loaded umbrella-like apparatus; the purpose being to bring as fast as possible, the main parachute canopy and its shroud lines into a stretched position from which, in due order, it will fill and open.

This intended stretching procedure, however, too often is not safely accomplished as the whole parachute falls out of the pack into the air stream as a baled-up heap. This heap offers a relatively great surface of attack to the air stream with the result that the pilot parachute lies in the lee or "shadow" of the wind, made possible by the baled-up canopy of the main parachute, and frequently the main parachute does not open properly. When this occurs, part of the canopy of the main parachute and the pilot chute separate from the body of the parachutist in a closed position and thereby, the heap of silk or nylon material turns and rolls in a form developed by the existing wind drift and fills itself, irregularly, sooner or later. By the time the filling starts, the heap has the tendency to turn or place itself into a group of shroud lines and if the filling begins these lines divide the parachute into two partly filled sections. If the heap continues to turn itself and the filling starts, then the parachute makes a complete turn from right to left or vice versa. In such a case, when using manual parachutes, the pilot parachute hangs inside the main parachute. In case the baled-up heap of silk or nylon slides farther through the lines and passes a second group of shrouds, then the filling in the canopy is blocked and a completely unopened parachute results.

In addition to the above three problems encountered in conventional parachutes, it is also known that parachutes are limited in their use by the velocity of the airplane and by the height from which the jumps take place. Even at velocities of 250 miles per hour, a parachute has a tendency to fill itself too rapidly. The connection line between the pilot chute and the main chute tends to tear at a velocity of as low as 125 miles per hour and at velocities of over 300 miles per hour, the total destruction of an undetachable pilot chute occurs before the main parachute canopy is completely stretched. This means that the main parachute is acting independently of the pilot chute. When the latter occurs, the filling of the canopy starts unevenly with a result that the filling of the first two panels, at velocities of over 200 miles per hour, cause tearing of the same. Furthermore, a velocity of 125 miles per hour, as well as the turbulent air streams within the so-called danger zone of the airplane, has an unfavorable influence especially upon the automatic parachute with the result that the number of functional mishaps is increased.

One of the objects of the invention is, therefore, to provide an orderly deployment of the parachute by a forcibly activated and automatically controlled rapid change from its folded position to its stretched position. According to applicant's German Patent No. 931,870 (1955), this task is aided by provisions in the pack cover which, together with the pull of the pilot parachute, bring about a gradual controlled release of the staggered, folded parachute pack. The invention disclosed in the above German patent provides a pre-determined delay of the emerging of the main parachute, having the result that at first only the pilot parachute with its connection line develops, without obstacles, its pulling power, which in turn will then free the folds of the main parachute and stretch it immediately so that no surface is exposed to the attack by the air stream in a way that can be undesirable to the filling action of the main parachute canopy. In addition to the accomplishment provided by the invention in the German patent, the present invention corrects further the above cited deficiencies and allows use of parachutes from greater altitudes and at higher velocities by means of: extra compartments in the pack, a brake parachute, a separate container for the brake parachute, separate packs for the three types of parachutes, and a stored-energy ejection device for the pilot parachute.

Therefore, an object of this invention is to provide an improved parachute.

A principal object of this invention is to provide an improved combination of parachutes employing a pilot parachute, a brake parachute, and a main parachute.

A further object of this invention is to provide a main parachute with a brake parachute in a separate container, said brake and main parachute being detachable from the pilot parachute.

A still further object of this invention is to provide an improved parachute in which each of the three parachutes are in separate compartments in the main pack.

Another object of this invention is to provide a stored-energy ejection device for the pilot parachute.

Other objects of this invention will become apparent from the following description taken in connection with the accompanying drawings, in which Fig. 1 is a side elevational view of the folded arrangement provided in the said German patent;

Fig. 9 shows a further opening of the parachutes and containers of the embodiments illustrated in Figs. 7 and 8;

Fig. 10 shows the individual main parachute pack open with the main parachute in stretched position;

Fig. 11 shows a skirt belt to delay the opening of the main canopy;

Fig. 12 shows a belt on the skirt of an automatic parachute to delay opening;

Fig. 13 shows the pilot chute's stored-energy ejection device secured on the lower exterior of a closed parachute pack and fitted toward the parachutist;

Fig. 14 illustrates the ejection device of Fig. 13 in detail;

Fig. 15 illustrates the pilot chute just after it has been ejected and before it starts to open as the result of tension on the connection line;

Fig. 16 shows the pilot chute after tension has been created on the connection line and with the collar removed to allow the parachute to start to open; and Fig. 17 shows the ejection device after the parachute has been ejected.

Figures 1, 2, 3, 4:
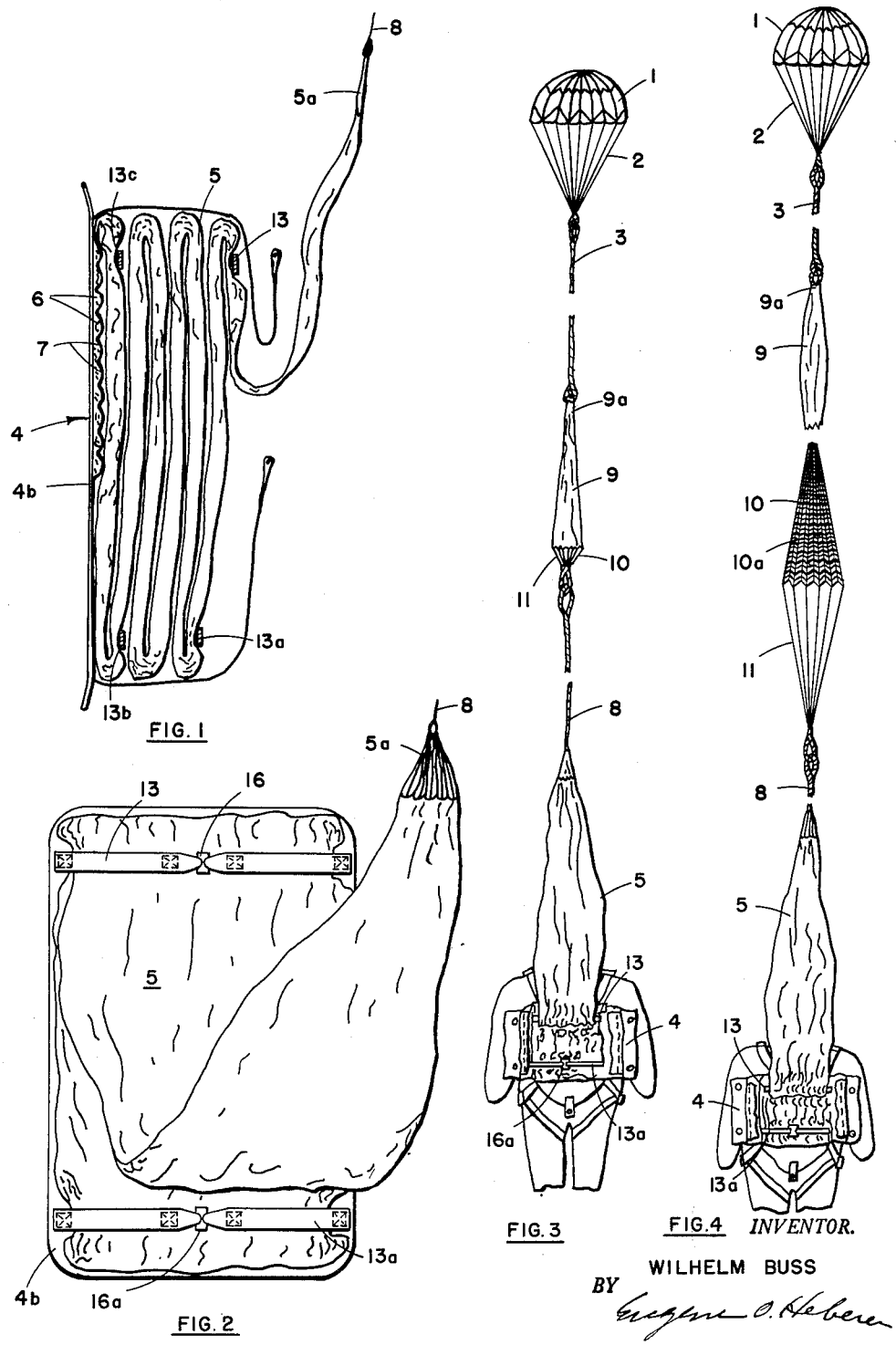
Fig. 2 is a front elevational view of the folded arrangement provided in the German patent.
Fig. 3 is a view of the combination of the German patented invention with the present invention showing the pilot chute open, the brake chute in its detachable container, and the main parachute in the process of being removed from the pack.
Fig. 4 shows a further development of the combination stretching process of the parachutes shown in Fig. 3 and shows the brake parachute container removed and detached from the brake parachute.
Figures 5, 6, 7, 8:
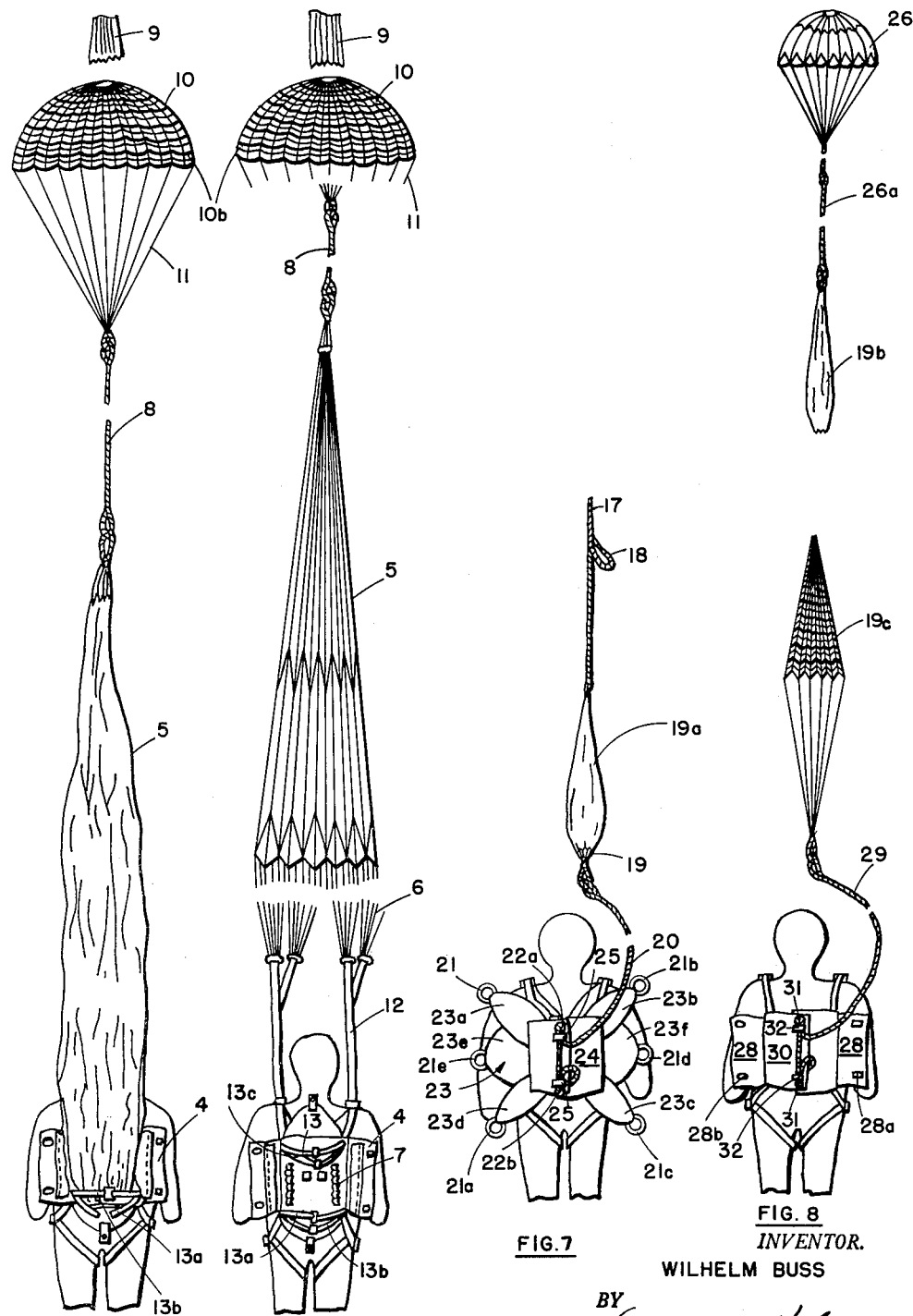
Fig. 5 shows the main parachute after the brake parachute has been filled.
Fig. 6 shows the main parachute in stretched position after it has been completely removed from the pack.
Fig. 7 shows another embodiment of the invention adapted for automatic operation and in which the brake and main parachutes are in separate containers.
Fig. 8 shows an embodiment of the invention as illustrated in Fig. 7 except that it is adapted for manual operation with the use of a pilot parachute.

Referring to Figs. 1 and 2, which illustrate the invention disclosed in German Patent No. 931,870 and which is now used in combination with the present invention, pack 4 contains back and forth or accordion folded main canopy 5. Shroud lines 6 are snugly engaged in rows in loops 7 but are fixed to pull out when tension is put on the main chute in the stretched position. The shrouds are strung, from left to right in the drawing, on back or bottom 4b of the pack and are the last parts of the parachute to be removed from the pack just prior to the filling of the chute. The empty loops are shown in Fig. 6. The main parachute is folded in a zig-zag or accordion manner and is held in position by cross straps, such as strap 13 on the upper top layer and 13a on the layer just below the top on the other end of the pack. Near bottom 4b of the pack are two other straps 13b and 13c holding the canopy in position. These four straps, or more or less, if desirable, hold the canopy snug in its folded position. When the pilot parachute has opened, the strap tension will not prevent the removal of the main canopy but will delay its withdrawal from the pack so that the parachute will not fall out in a heap, as indicated below.

The air vent or apex 5a at the top of the canopy is shown to be attached to connection line 8 which is in turn attached to the brake chute as indicated in Fig. 3. Connection 8 would be attached to the pilot chute, if there were no brake chute in the combination. After the pilot chute has opened the canopy unfolds "slowly" from under the straps 13, 13a, 13b and 13c, and it is impossible for unfavorable disturbances to occur as each free part of the parachute is stretched separately before the next part of the parachute is freed. Thus, a constant and regular deployment of the parachute results, and makes for the greatest safety, particularly when jumping at a great flying velocity. Strap latches 16 and 16a are fixed to break at a certain pre-determined stress in the event that the parachute's folds do not slip out.

Even though the release of the parachute is retarded, this folding arrangement provides deployment in shorter time than required for an uncontrolled parachute that is dumped out in a heap. This is due to the fact that the chute, in the present invention, not having an uncontrollable intermediate state, is converted immediately to the stretching position on removal from the pack. In addition to the generally increased safety, this permits lower jumping heights.

Referring to Figs. 3–6, pilot chute 1 is in the open position, having shrouds 2 attached to connection line 3, which is in turn attached to closed end 9a of brake parachute container or sock 9. The brake and pilot chutes could have been packed in the same pack as the main chute or could have been packaged in separate packs on the main pack. Brake parachute 10 is snugly held in container 9. Shrouds 11 of brake parachute 10 are joined undetachably to connection line 8, extending from the top of main parachute 5. The pack opening was started by a hand operated rip-cord, and the unfolding of main parachute 5 is shown as developing along the pulling of brake parachute 10 from container 9. As tension develops in lines 3 and 8, due to the weight of the jumper's body against the open pilot chute 1, brake chute 10 is pulled out of container 9. At the same time the tension causes main chute 5 to start to unfold from straps 13, 13a, 13b and 13c. In Fig. 4, chute 5 is only slightly removed from pack 4 and brake parachute 10 is starting to fill. In Fig. 5, brake parachute 10 is completely filled and main chute 5 is shown to be farther removed from the pack in a stretched position. In Fig. 6, main chute 5 is completely withdrawn, along with straps 12, and is ready to start to fill from its stretched position. Also shown in Fig. 6, are loops 7 in which shrouds 6 were held in a back and forth, substantially horizontal position from one side of pack 4 to the other.

Brake chute 10 is made of ribbon or mesh material, as indicated by the substantially horizontal lines which represent individual ribbons. There are air spaces 10b between each succeeding ribbon 10a throughout the canopy. Because the ordinary parachute will stand velocities of only 300 to 350 miles per hour, parachute canopies have been constructed of ribbon with the intention to counteract the braking action when the parachute is filling with air and to give them more strength. Ribbon chutes are used generally for great loads and to brake the speed of landing planes. They, however, are too bulky to use in a pack as a man's main parachute, because the requirement for open space between the ribbons requires that the chute be proportionately larger. However, in accordance with this invention, the ribbon chute has been found to be of great advantage as a braking chute when placed between the pilot chute and the main chute. The brake chute in the present invention has the task of keeping the main canopy in stretched position until such time as the velocity of the air stream is decreased by the opening of the former. Only then does the filling of the main chute start. By reason of the high braking action at velocities of over 250 miles per hour, the main parachute is restrained from filling too rapidly. The restrained filling of the main parachute in a stretched position is caused by two pulling forces. One is the open brake chute and the other is the body weight of the jumper. Between these two pulling forces lies the stretched unopened main parachute. At velocities between 310 and 375 miles per hour the main parachute is restrained from filling too rapidly for a fraction of a second and when the velocity of the parachute and the parachutist has reached a tolerable limit, the filling of the main chute then takes place. This system permits the use of a manually or automatically opened parachute at velocities higher than the normal limit of 250 miles per hour. On account of the brake action at 310 miles per hour velocity, the connection line 8 between the main chute and the brake chute must have a minimum tensile strength of 6,600 pounds. At a velocity of 435 miles per hour, the tensile strength must be 8,800 pounds.

Another embodiment of the present invention is shown in Figs. 7–10. By means of the provision of 1, 2, 3, 4 or more compartments in the main pack, the main parachute with its brake and pilot chute may be released successively only when the previous chute has been completely filled. In Fig. 7 is shown static line 17 which is used for automatic operation. The static line is attached to the airplane and the jumping of the parachutist puts tension on this line and starts the withdrawal of the parachute. The static line is connected to brake chute container 19a, and brake chute 19 is withdrawn from it. The static line and container 19a remain with the airplane. No pilot chute is used with this type of automatic operation. In static line 17 is loop 18, or a pin, which is used to hold first or outside pack 23 closed by means of extending through loops 21, 21a, 21b, 21c, 21d and 21e. In holding outside pack 23 closed, shown in the open position with its six unfolded flaps 23a, 23b, 23c, 23d, 23e and 23f, loop 18 had been fitted into loops 21, 21a, 21b, 21c, 21d and 21e, in the same manner as loops 22a and 22b are shown holding pack 24 closed by their insertion through loops 25. Pins attached to line 20 could be used, instead of loops 22a and 22b, in loops 25 to hold pack 24 closed. Thus, when tension was first applied to line 17, loop 18 was pulled out of loops 21, 21a, 21b, 21c, 21d and 21e, opening the six flaps, as indicated, and caused brake chute 19 in container 19a to be free of the pack. As tension further develops in line 17, brake chute 19 is pulled from the container and is caused to fill.

When chute 19 is filled, tension develops in line 20 which causes loops 22a and 22b to be withdrawn from loops 25 so as to open pack 24. In pack 24, there is a main parachute such as chute 5, shown in Figs. 1-6, or one like chute 40, in a container like pack 34 in Fig. 9, and withdrawn from the pack in Fig. 10. In other words, the main parachute in pack 24 can be folded, as shown in Fig. 1, or can be arranged in a third pack as container 34 in Fig. 9, and the withdrawal and filling of this main chute can follow that of the chute in Figs. 4-6 or that of Figs. 9 and 10.

In Fig. 8, the pack arrangement is similar to that in Fig. 7, except that it is adapted for manual operation and a pilot parachute is used. Pilot chute 26 could have been packed in open pack 28 along with brake chute 19c and its container or sock 19b, or it could have been held in stored-energy ejection device, such as the one shown in Fig. 13. Pilot chute 26 also could have been stored alone in a pack, such as 23 or 28, the brake chute then being in a separate and additional pack.

Pilot chute 26 is shown in the open position and ribbon brake chute 19c is shown as having been withdrawn from sack or container 19b. Container 19b, like container 9 in Fig. 4 and container 19a in Fig. 7, is a narrow elongated teardrop-shaped sack having one end open and is constructed to form a snug fit around the ribbon parachute. The withdrawal of the pilot, brake, and main chutes from their respective packs, or out of a main pack containing the separate packs, in Figs. 8-10, could have been started by manual operation with a rip cord to cause the pilot chute to come out of a separate pack or out of a pack which also contained the brake chute, or by ejection of the pilot chute from a stored-energy device, situated externally of the packs.

In Fig. 8, pilot chute 26 has been ejected from a stored-energy container, or has been withdrawn from an additional container, not shown, or from container 28 which had also held brake chute 19c in sack 19b. In the first and second cases, for example, pack 28 would have been opened by the tension put on line 26a. Line 26a could have been inserted in loops 28a which would have been extending through holes 28b, as are loops 25 in Fig. 7. In the latter case, that is, in container 28, it would have been opened by a tension on a rip cord, not shown. Further tension on line 26a by the weight of the parachutist pulling against the filled pilot chute caused the withdrawal of brake chute 19c from sack 19b. Then, as tension developed in line 29, the brake chute was withdrawn from the sack. At this time the pilot chute has become detached from the parachutist and the brake chute, having been removed from his body, is permitted to open in an orderly manner.

After brake chute 19c is open, as shown in Fig. 9, the tension in line 29 withdraws loops 31 from loops 32 which extend through holes 32a in pack 30, and this opens pack 30, shown closed in Fig. 8 and open in Fig. 9. On the opening of pack 30, pack 34, containing main chute 40, is withdrawn. Pack 34 is connected to line 29 by line 33 and is connected to pack 30, harness 37a and the parachutist by riser straps 37. Main parachute 40 can be folded in pack 34 in any conventional manner or can be folded in the back and forth manner shown in Fig. 1. Cross straps, similar to strap 13, can be used to aid in the orderly deployment of parachute 40 in its withdrawal from pack 34. Shrouds 36 of main parachute 40 are shown zigzaggedly arranged across flap 38 and are holding it closed on pack 34. Shrouds 36 are snugly fit, over two opposite edges of cover 38, in loops 35 so as to delay the opening of said cover when tension develops in line 33 and straps 37. At the bottom of pack 34, there are breakable thread connections 35a, sewed through pack 34 and straps 37 to hold the straps so that they and pack 34 perform briefly as a supporting line and stretch the lines in preparation for the withdrawal of the main chute. Tension on straps 37 breaks thread 35a and start withdrawal of shrouds 36 from loops 35, the straps being connected to the shrouds just above threads 35a. Shrouds 36 pull out of loops 35 as soon as threads 35a are broken.

In Fig. 10, pack 34 is shown having its cover 38 in the open position with shrouds 36 withdrawn from loops 35. Connection line 39 extends through pack cover 38 and into pack 34 where it is connected to line 33. Here main canopy 40 is now ready to open. The series of withdrawals from the various packs shown in Figs. 7-10, delay the opening of the successive chutes until the proper time. The packs 23, 24, 28, 30 and 34, the straps, the lines and the shrouds can be made of nylon, perlon, or similar materials.

Inner pack 34 separates from the parachutist and the subsequent deployment of the main chute takes place away from him. As shroud lines 36 are withdrawn from loops 35, they slide away from the pack and are stretched. After the withdrawal and stretching of the last group of shrouds, pack cover 38 opens and main parachute 40 is released. Because of the fact that pack 34 is unreleasably attached by connection line 33 via line 29 to the brake chute, or to what might be an enlarged pilot chute, on one side, and to the main chute on the other side, no entanglements can take place in the deployment of the main parachute, as a large pilot chute or brake chute holds the main parachute in a stretching position until the velocity of the air stream against the brake chute is decreased and the filling of the main canopy can take place without turning or damage.

Referring to Fig. 11, to prevent the filling at very high velocities of the canopy of a nonautomatic parachute immediately after it leaves a pack, such as pack 4 or separate container 34, the skirt 40b of canopy 40a has belt 41 secured around it. Belt 41 is sewed to skirt 40b at one point 41a. Loop 43 in belt 41 extends through hole 42 in the other end of said belt so that pin 44, or a loop, is inserted in loop 43 to hold the belt snug around the canopy. Pin 44 is undetachably tied to shroud 45a which is of the same length as other shrouds 45. All shrouds have one end attached to the skirt and the other end to straps 46, which are in turn connected to the parachutist. By having shroud 45a moved out from the remainder of the shrouds, toward belt 41, and secured above the skirt edge by the gripping of loop 43 on pin 44, shroud 45a is in effect shortened relative to the others and the skirt.

If the main canopy is packed within a pack, such as 34, in Fig. 9, the shortening effect on shroud 45a is not noticeable except within the pack adjacent the skirt. Lengthwise, on the outside of the pack cover, the shrouds are all of equal length and are inserted in the loops of the pack cover. Then, when the pack cover is opened, as described relative to Figs. 9 and 10, the canopy and the shrouds are pulled from the loops on the pack into a stretched position. In this process shroud 45a is stretched first, pulling pin 44 out of loop 43 and from the belt, to open it and free the canopy for filling.

In the same manner, the withdrawal of the pin from the belt can be accomplished with a separate line, rather than a shroud, extending from the riser straps to the belt. This line, also, should be in stretched position before the shrouds and be equal in length therewith, if attached to the edge of the skirt.

To permit the brake chute, instead of the pilot chute, when used, to function as the brake, it is necessary that the main parachute canopy be closed until it is completely stretched. With the belt surrounding the skirt of the main chute, the braking action of the brake chute has its full effect and holds the main canopy in stretched position at very high velocities a brief time, but long enough to delay the deployment of the main canopy until the velocity is more favorable to it and the parachutist. In other words, for the very high velocities the belt closure provides more slowing down time during the stretching operation.

In automatic parachute combinations, actuated by a static line attached to the airplane, the main chute being stretched by a brake chute and the parachutist, the skirt of the main canopy can also be enclosed by a belt 41 and locked by pin 44a, as shown in Fig. 12. Pin 44a is connected to line 47, enclosed against chute 40c by strip patch 47a. Line 47 is secured to the edge of apex 40d of the canopy and is 10 to 15 centimeters shorter than the distance between the apex and the belt. Thus, just before the canopy is completely stretched, the pin is pulled from loop 43, as shown, and the canopy is then freed for filling. This arrangement, although preferred for use in automatic parachutes, can also be used in non-automatic parachutes.

In this invention, the brake chute takes the place of a pilot chute after the pilot chute has deployed the brake chute. The size of the brake chute is determined by the velocity of the airplane and also is constructed of a size corresponding to the main parachute. Its main purpose is to deploy the main parachute for the filling by air at a time it can be done in a very orderly manner. The ribbon brake chute is also of great advantage because of its woven construction which allows the passage of air through it and thus, decreases the filling shock considerably, even at high velocities, compared with that of an ordinary chute. The result of this is the prevention of damage to the main parachute. By the use of the brake chute, as shown in the present invention, it is now possible to use any main parachute at the highest velocities. The skirt closure, in Figs. 11 and 12, is ideal at higher velocities because, if as many as six parachutes are used by a parachutist, as may be required because of the high velocities, without it two or three of the parachutes would start filling at the same time and prevent orderly deployment in the opening of the remaining chutes.

The known pilot chutes are constructed with pressure or spreading springs which causes them to open automatically. However, the existing spring forces are not always sufficient to remove the pilot chute from the danger zone of the parachutist. In the event that the parachutist lies with his back towards the earth, the pilot chute remains hanging; the main canopy separates from the parachutist first, and entanglements of the main canopy and the pilot chute with the parachutist occur. In case the parachutist lies with his back towards the horizon, the pilot chute does not separate from the parachutist because it lies in the lee of the parachutist. In this case the main canopy is in front of the pilot chute and the latter does not separate from the jumper, whereby entanglements occur between the parachute and the parachutist and damage is done to the parachute. A fatal crash then takes place.

Now referring to Figs. 13, 14, 15, 16, and 17, a pilot chute with a stored-energy ejection device is shown. Pilot chute 50 has springs 52 sewn in the canopy. They are similar to umbrella stays except that they automatically force the pilot chute open when any holding force is released from them. In Fig. 14, pilot chute 50 is shown in stored-energy ejection device 53 which comprises a light metal container 53a of oval, rectangular or round configuration. However, for space reasons the relatively oval configuration is generally best. Container 53 has one open end 53c and a substantially closed end 53b. In end 53b, there is a small opening 62 through which stud or locking rod 57 can be extruded, shown in Figs. 14 and 17. Stud 57 is secured to the external bottom 59a of cup 59 along with compression spring 54 which surrounds stud 57. Compressed air can be used in device 53 instead of spring 54, if it is desired, to eject the pilot chute. To put the cup 59 in position for spring 54 to eject the chute, stud 57 is pushed down to closed end 53b and is pushed through opening 62. In stud 57 is an opening 57a through which locking pin 56 is inserted so as to hold cup 59 in its loaded or stored-energy position. Attached to pin 56 is line 55 fixed to rip-cord line 55a in the front, not shown (for automatic operation pin 56 is connected to the static line which is attached to the airplane). Prior to loading ejection device 53, collar or pocket 60 is placed over the skirt end of pilot chute 50 after the shrouds 58 have been placed along side each other inside the canopy in an orderly manner to allow easy withdrawal. Pilot chute 50 is then inserted into open end 53c of container 53a so that the cloth pocket 60 is fitted into cup 59. Connection line 61 is attached to the main parachute 51, or to the brake parachute, or to the brake parachute container, whichever is provided. The stored-energy ejection device together with the folded springs in the pilot chute, has the task of causing the pilot chute to open almost immediately after rip-cord line 55a and line 55, attached thereto, are pulled, causing pin 56 to be withdrawn from stud 57. Spring 54 forces cup 59 toward open end 53c where it is held in by rim 53d. This causes the chute to be ejected from container 53 in a rapid manner so as to force it away from the shadow of the wind, and the danger zone of the parachutist before the main canopy or brake canopy starts to open. This result is especially desirable when the parachutist is turning over very rapidly.

As shown in Fig. 15, when the pilot chute is first ejected, it is held loosely but closed by collar 60 until line 61 is stretched. Collar 60 is slidably fixed on line 61 not to pass above loop 63 which is connected to shrouds 58. Thus, when the chute is ejected rapidly, a tension is created in line 61 which tends to pull it and shrouds 58 away from parachute 50. As shown in Fig. 16, as tension develops further, line 61 and collar 60 come to a sudden, brief stop and the momentum created by the ejecting force on parachute 50 pulls it out of the collar, allowing springs 52 to spread and open the chute.

Stored-energy ejection device 53 can be fastened on any side of the pack, and the pilot chute can be ejected from the bottom of the pack, across the seat or from the side to right or left. The preferred location is against the back of the parachutist, facing downward, as shown in Fig. 13. Rip-cord 55a is connected to pull fork 65 which opens pack 66 at the same time locking pin 56 is removed from stud 57. A pull fork operated in this manner causes forks or pins 65a to be released from loops or holes 65b inside the pack and opens it to permit the brake and main parachute to be withdrawn. Each end of fork pin 65a is inserted through pin or loop 65b so as to hold the flap cover closed. Thus, when pins 65a are withdrawn from loops 65b the pack opens.

It is considered that the combination of the various delaying devices disclosed herein provide considerable advancement in the parachute art. There have been in the past a relatively high percentage of fatal crashes by jumpers where their parachutes have become tangled or have completely failed to open for reasons which have been described above. This combination is comprised of a series of devices, all of which function with the final purpose to cause the main parachute to open properly and away from the jumper. The orderly deployment of the three types of parachutes can be easily seen. First, the stored-energy ejected pilot chute opens free of the jumper. Then, the brake chute opens immediately, but away from the parachutist. This brakes the fall and prevents damage to the main parachute. However, not until the brake chute has fully opened will the main chute be completely stretched and ready for opening. And finally, the opening of main chute occurs only after the release of the belt surrounding its skirt.

In conjunction with the above, the provision of separate compartments for the various chutes further aids to prevent entanglement of the main parachute with its shrouds or other lines and with the parachutist. It can be readily understood that this combination is a great improvement over the type of parachute in which the main chute is dumped out of the pack as a baled-up heap.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, a parachute harness, a first parachute pack secured to said harness, a pilot parachute secured in a stored-energy ejection device, said device being secured on said first pack, a second pack removably secured in said first pack, a main parachute in said second pack, a brake parachute container removably held in said first pack; said container being an elongated, narrow sack having one open end; a ribbon brake parachute, said container detachably holding said brake parachute snugly therein, a first line connecting the shrouds of said pilot parachute to the closed end of said brake parachute container, a second line undetachably connecting the shrouds of said brake parachute to said second pack, and a third line undetachably connecting said second pack to the top of the canopy of said main parachute, the shrouds of said main parachute connected to said harness by straps, said second pack having a flap cover over its opening, said flap cover held closed by shrouds of said main parachute, said shrouds zigzaggedly interlaced over said cover and through loops adjacent said cover in said second pack, said last-mentioned shrouds held snugly in said loops, said main parachute shrouds being adapted to disengage from said loops when tension is created in said straps and said third line, means on said second pack and said straps to delay the disengaging of said shrouds from said loops when said tension is created, said tension being caused by filling said brake parachute with air, whereby said flap cover is caused to open and said main parachute is caused to be pulled out of said second pack.

2. The combination according to claim 1 in which said means to delay the disengaging of said shrouds from said loops comprise breakable threads holding said straps to said second pack adjacent where said shrouds connect said straps.

3. In a parachute assembly, a parachute harness, a first parachute pack secured to said harness, a pilot parachute detachably secured on said first pack line, means on said first pack to release said pilot parachute, a brake parachute container in said first pack, a brake parachute removably fitted in said container, a second pack secured to said harness, a third pack removably in said second pack, a main parachute in said third pack, a first line undetachably connecting the shrouds of said pilot parachute to said brake parachute container, a second line undetachably connecting the shrouds of said brake parachute to said third pack and to the top of the canopy of said main parachute, said third pack in position to be suspended on said second line between said brake parachute and said main parachute when said brake parachute is air-filled, the shrouds of said main parachute connected to said harness by straps, retaining means on said first pack and connected to said pilot parachute for releasably maintaining said container in said first pack, means on said second pack responsive to the filling of said brake parachute for releasing said third pack from said second pack, and means on said third pack responsive to tension on said straps to release said main parachute from said third pack.

4. In a parachute assembly according to claim 3, means on said third pack to delay the release of said main parachute therefrom after tension has been created in said straps.

5. In a parachute assembly according to claim 3, means to delay the opening of said main parachute after it is released from said third pack, said last mentioned means releasably surrounding the skirt thereof.

6. In a parachute assembly, a parachute harness, a a first parachute pack secured to said harness, a first parachute container removably secured in said first pack, a first parachute snugly and removably fitted in said container, a second pack secured to said harness, a third pack removably secured in said second pack, a main parachute in said third pack, a first line undetachably connecting the shrouds of said first parachute to said third pack and undetachably connecting said first parachute to the canopy of said main parachute, said third pack in position on said first line to be suspended thereon between said first parachute and said main parachute when said first parachute is air-filled, the shrouds of said main parachute connected to said harness by straps, means on said second pack to release said third pack therefrom after said first chute has filled with air, and means on said third pack responsive to tension on said straps to release said main parachute from said third pack.

7. In a parachute assembly according to claim 6, means to delay the release of said main parachute from said third pack after said third pack has been released from said second pack, said last-mentioned means being releasably secured to said straps and to said third pack.

8. In a parachute assembly according to claim 6, means to delay the opening of said main parachute after it is released from said third pack, said last-mentioned means surrounding the skirt of said main parachute.

9. In a parachute assembly according to claim 8, in which said last-mentioned means comprises a belt surrounding the lower portion of the main canopy skirt, retaining means on said belt for releasably maintaining said belt in position to shield the skirt and lower portion of the canopy, and said last-mentioned means being responsive to the full extension of said shroud lines for releasing said retaining means.

10. In a parachute assembly according to claim 9, in which said retaining means on said belt comprises a loop in one end of said belt extending through a hole in the other end of said belt, a pin extending through said loop so as to hold the ends of said belt together, said pin being secured to a first shroud of said main parachute at a point adjacent one end of said first shroud, said first shroud being of the same length as the other of said shrouds, whereby when said shrouds and said main parachute are being stretched, said first shroud will pull said pin from said loop, said belt will be open and said main parachute will be free to open.

11. In a parachute assembly according to claim 9 comprising a loop in one end of said belt extending through a hole in the other end of said belt, a pin extending through said loop so as to hold said ends of said belt together, said pin being secured to the lower end of a pin line having its other end secured to the top of said main parachute and extending on the surface thereof, said pin line being shorter than the distance between the top of said parachute and said belt when said main parachute is stretched whereby when said main parachute is stretched, said pin line will pull said pin from said loop, said belt will open and said main parachute will be free to open.

(References on following page)

References Cited in the file of this patent

UNITED STATES PATENTS

| | | |
|---|---|---|
| 1,072,764 | Nagel | Sept. 9, 1913 |
| 1,277,892 | Evans | Sept. 3, 1918 |
| 1,895,999 | Kuhlemann | Jan. 31, 1933 |
| 1,985,890 | Ellis | Jan. 1, 1935 |
| 2,389,578 | Quilter | Nov. 20, 1945 |
| 2,403,832 | Smith | July 9, 1946 |
| 2,501,559 | Winzen et al. | Mar. 21, 1950 |
| 2,519,923 | Noelcke | Aug. 22, 1950 |
| 2,663,525 | Smith | Dec. 22, 1953 |
| 2,702,679 | Culver | Feb. 22, 1955 |
| 2,732,153 | Frieder et al. | Jan. 24, 1956 |
| 2,749,066 | Barnes et al. | June 5, 1956 |
| 2,762,588 | Martin | Sept. 11, 1956 |
| 2,765,132 | Oakley | Oct. 2, 1956 |

FOREIGN PATENTS

| | | |
|---|---|---|
| 711,704 | France | June 30, 1931 |
| 931,870 | Germany | Aug. 18, 1955 |

OTHER REFERENCES

Summary Report No. F–SU–1107–ND; Report on the works of the "Parachute Department" (Forschungsanstalt Graf Zepplin), by Prof. Dr.-Ing. Georg Madelung, publication date May 1946; page 16 relied upon; published by Headquarters Air Materiel Command, Wright Field, Dayton, Ohio.